United States Patent
Chowanic

(10) Patent No.: US 10,140,864 B2
(45) Date of Patent: Nov. 27, 2018

(54) END OF JOURNEY STREET PARKING GUIDANCE

(71) Applicant: FORD GLOBAL TECHNOLOGIES, LLC, Dearborn, MI (US)

(72) Inventor: Andrea Bowes Chowanic, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/499,250

(22) Filed: Apr. 27, 2017

(65) Prior Publication Data

US 2018/0315311 A1   Nov. 1, 2018

(51) Int. Cl.
*G08G 1/14* (2006.01)
*G08G 1/0969* (2006.01)

(52) U.S. Cl.
CPC ........... *G08G 1/143* (2013.01); *G08G 1/0969* (2013.01)

(58) Field of Classification Search
None
See application file for complete search history.

(56) References Cited

U.S. PATENT DOCUMENTS

| | | | |
|---|---|---|---|
| 6,340,935 B1 * | 1/2002 | Hall | G07B 15/04 340/905 |
| 8,854,205 B2 * | 10/2014 | Daniel | G06Q 10/08 340/2.1 |
| 9,064,417 B2 | 6/2015 | Smullin et al. | |
| 9,098,929 B1 | 8/2015 | Wakim | |
| 9,222,795 B1 * | 12/2015 | Gerlach | G01C 21/3667 |
| 9,613,532 B2 * | 4/2017 | Smullin | G08G 1/142 |
| 2007/0040701 A1 * | 2/2007 | Browne | G08G 1/14 340/932.2 |
| 2009/0088959 A1 * | 4/2009 | Mori | G08G 1/0104 701/118 |
| 2010/0302068 A1 * | 12/2010 | Bandukwala | G08G 1/14 340/932.2 |
| 2011/0046879 A1 | 2/2011 | Celli et al. | |
| 2011/0133957 A1 * | 6/2011 | Harbach | G08G 1/14 340/932.2 |
| 2012/0062395 A1 * | 3/2012 | Sonnabend | G06K 9/00791 340/932.2 |
| 2013/0176147 A1 * | 7/2013 | Anderson | G08G 1/143 340/932.2 |
| 2013/0257632 A1 * | 10/2013 | Harber | G08G 1/0112 340/932.2 |
| 2014/0085112 A1 * | 3/2014 | Gruteser | B60Q 9/004 340/932.2 |
| 2014/0118167 A1 * | 5/2014 | Im | G08G 1/092 340/901 |
| 2014/0176349 A1 * | 6/2014 | Smullin | G08G 1/142 340/932.2 |
| 2015/0254608 A1 | 9/2015 | Perez | |
| 2016/0284217 A1 * | 9/2016 | Lee | G08G 1/143 |

* cited by examiner

*Primary Examiner* — Curtis King

(74) *Attorney, Agent, or Firm* — Jennifer M. Stec; Brooks Kushman P.C.

(57) ABSTRACT

A parking server is queried for parking data descriptive of locations of available on-street parking spots. On a map indicating a current location of a vehicle and an upcoming intersection to be traversed by the vehicle, a depiction of parking availability is overlaid, indicating, for each leg of the intersection, a number of on-street parking spots available down the respective leg according to the parking data.

16 Claims, 5 Drawing Sheets

US 10,140,864 B2

END OF JOURNEY STREET PARKING GUIDANCE

TECHNICAL FIELD

Aspects of the disclosure generally relate to systems and method for street parking guidance at the end of a vehicle journey.

BACKGROUND

Street parking availability is difficult for drivers to determine while driving. Finding parking requires visually scanning an area, weighing options, selecting a parking location, and setting it as a destination. Cellular phones may have parking applications installed that provide parking information, but such applications may be unsafe to use while performing the driving task.

SUMMARY

In one or more illustrative embodiments, a system includes a memory storing parking data; and processor of a vehicle programmed to display, to a screen, a map including a current location of a vehicle and an upcoming intersection to be traversed by the vehicle, and overlay, on the map, a depiction of parking availability indicating, for each leg of the intersection, a number of on-street parking spots available down the respective leg according to the parking data.

In one or more illustrative embodiments, a method includes querying a parking server for parking data descriptive of locations of available on-street parking spots; and overlaying, on the map indicating a current location of a vehicle and an upcoming intersection to be traversed by the vehicle, a depiction of parking availability indicating, for each leg of the intersection, a number of on-street parking spots available down the respective leg according to the parking data.

In one or more illustrative embodiments, a non-transitory computer-readable medium comprising instructions of a navigation application that, when executed by a processor of a vehicle computing system, cause the processor to overlay, on a map indicating a current location of a vehicle and an upcoming intersection to be traversed by the vehicle, a depiction of parking availability indicating, for each leg of the intersection, an availability of on-street parking spots available down the respective leg according to the parking data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An improved parking guidance feature may be added to existing in-vehicle navigation application screens. The parking feature may include indications descriptive to availability of on-street and/or off-street parking. To avoid adding to the user's driving workload, these indications may be overlaid on a main navigation map.

The on-street parking feature may depict parking availability based on the next intersection that the vehicle will reach, such that the display provides indications of how many parking spaces are available in each possible direction. For instance, the display may indicate how many parking spots are available in the next block if the driver turns right, left, or goes straight. Accordingly, the on-street parking feature fuses turn direction navigation information with parking spot availability for upcoming intersections. In one example, the on-street parking feature displays a detailed intersection view of the map for each intersection as the driver approaches it, with overlaid arrows on top of each road in the intersection extending to the next intersection and indicating parking availability on that street segment. In another example, the overlay may extend past a next street to a further street in the intersection if that map view was appropriate for the driving situation and the map content, e.g., for very short street blocks. Further details of the parking feature are discussed in detail below.

Figure 1:
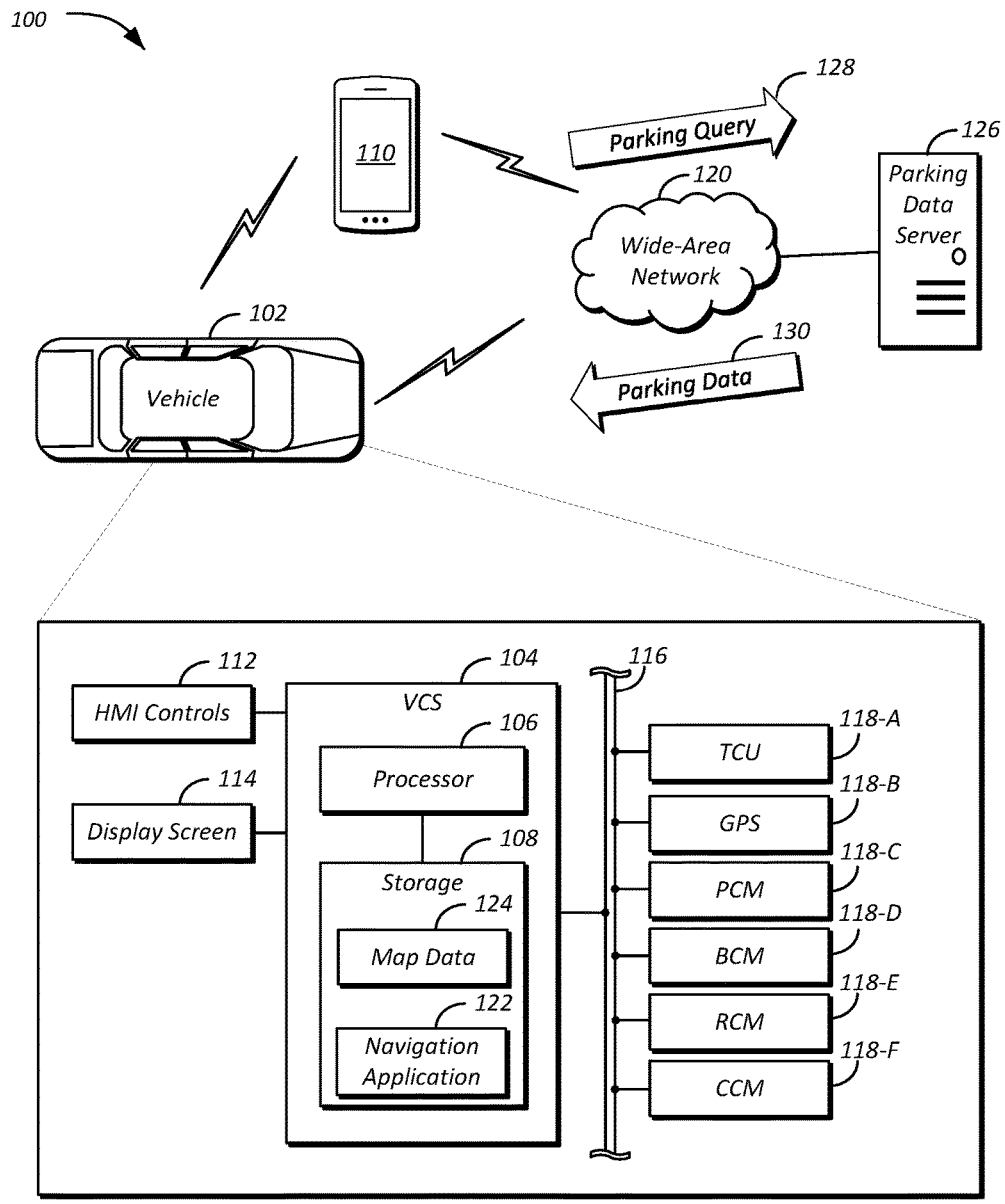
FIG. 1 illustrates an example system including a vehicle implementing on-street parking features.

FIG. 1 illustrates an example system 100 including a vehicle 102 implementing on-street parking features. The vehicle 102 may include a vehicle computing system (VCS) 104 configured to communicate over a wide-area network 120, e.g., using a mobile device 110 or a telematics control unit (TCU) 118-A. The system also includes a parking data server 126 configured to provide parking data 130 over the wide-area network 120 to the vehicle 102. The VCS 104 may be configured to utilize a navigation application 122 installed to the VCS 104 to request the parking data 130 from the parking data server 126, and to display parking feature visualizations on a display 114 of the vehicle 102 to depict parking availability in the context of the navigational map. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The VCS 104 may be configured to support voice command and BLUETOOTH interfaces with the driver and driver carry-on devices, receive user input via various buttons or other controls, and provide vehicle status information to a driver or other vehicle 102 occupants. An example VCS 104 may be the SYNC system provided by FORD MOTOR COMPANY of Dearborn, Michigan.

The VCS 104 may further include various types of computing apparatus in support of performance of the functions of the VCS 104 described herein. In an example, the VCS 104 may include one or more processors 106 configured to execute computer instructions, and a storage 108 medium on which the computer-executable instructions and/or data may be maintained. A computer-readable storage medium (also referred to as a processor-readable medium or storage 108) includes any non-transitory (e.g., tangible) medium that participates in providing data (e.g., instructions) that may be read by a computer (e.g., by the processor(s)). In general, a processor 106 receives instructions and/or data, e.g., from the storage 108, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The VCS 104 may be configured to communicate with mobile devices 110 of the vehicle occupants. The mobile devices 110 may be any of various types of portable computing device, such as cellular phones, tablet computers, smart watches, laptop computers, portable music players, or other devices capable of communication with the VCS 104. As with the VCS 104, the mobile device 110 may include one or more processors configured to execute computer instructions, and a storage medium on which the computer-executable instructions and/or data may be maintained. In many examples, the VCS 104 may include a wireless transceiver (e.g., a BLUETOOTH controller, a ZIGBEE transceiver, a Wi-Fi transceiver, etc.) configured to communicate with a compatible wireless transceiver of the mobile device 110. Additionally, or alternately, the VCS 104 may communicate with the mobile device 110 over a wired connection, such as via a USB connection between the mobile device 110 and a USB subsystem of the VCS 104.

The VCS 104 may also receive input from human-machine interface (HMI) controls 112 configured to provide for occupant interaction with the vehicle 102. For instance, the VCS 104 may interface with one or more buttons or other HMI controls 112 configured to invoke functions on the VCS 104 (e.g., steering wheel audio buttons, a push-to-talk button, instrument panel controls, etc.). The VCS 104 may also drive or otherwise communicate with one or more displays 114 configured to provide visual output to vehicle occupants, e.g., by way of a video controller. In some cases, the display 114 may be a touch screen further configured to receive user touch input via the video controller, while in other cases the display 114 may be a display only, without touch input capabilities. In an example, the display 114 may be a head unit display included in a center console area of the vehicle 102 cabin. In another example, the display 114 may be a screen of a gauge cluster of the vehicle 102.

The VCS 104 may be further configured to communicate with other components of the vehicle 102 via one or more in-vehicle networks 116. The in-vehicle networks 116 may include one or more of a vehicle controller area network (CAN), an Ethernet network, and a media oriented system transfer (MOST), as some examples. The in-vehicle networks 116 may allow the VCS 104 to communicate with other vehicle 102 systems, such as a vehicle modem of the TCU 118-A (which may not be present in some configurations), a global positioning system (GPS) module 118-B configured to provide current vehicle 102 location and heading information, and various other vehicle ECUs configured to corporate with the VCS 104. As some non-limiting possibilities, the vehicle ECUs may include a powertrain control module (PCM) 118-C configured to provide control of engine operating components (e.g., idle control components, fuel delivery components, emissions control components, etc.) and monitoring of engine operating components (e.g., status of engine diagnostic codes); a body control module (BCM) 118-D configured to manage various power control functions such as exterior lighting, interior lighting, keyless entry, remote start, and point of access status verification (e.g., closure status of the hood, doors and/or trunk of the vehicle 102); a radio transceiver module (RCM) 118-E configured to communicate with key fobs or other local vehicle 102 devices; and a climate control management (CCM) 118-F module configured to provide control and monitoring of heating and cooling system components (e.g., compressor clutch and blower fan control, temperature sensor information, etc.).

The wide-area network 120 may include one or more interconnected communication networks such as the Internet, a cable television distribution network, a satellite link network, a local area network, a wide area network, and a telephone network, as some non-limiting examples. Using an embedded modem of the VCS 104 (or a mobile device 110 of the user connected to the VCS 104), the vehicle 102 may be able to send outgoing data from the vehicle 102 to network destinations on the wide-area network 120, and receive incoming data to the vehicle 102 from network destinations on the wide-area network 120.

The TCU 118-A may include a cellular modem or other network transceiver configured to facilitate communication over the wide-area network 120 between the vehicle 102 and other devices of the system 100. In an example, the VCS 104 may be configured to access the communications features of the TCU 118-A by communicating with the TCU 118-A over a vehicle bus 116. As some examples, the vehicle bus 116 may include a controller area network (CAN) bus, an Ethernet bus, or a MOST bus. In other examples, the VCS 104 may access the wide-area network 120 using the communications services of the mobile device 110. In an example, the VCS 104 may communicate with the mobile device 110 over a local area connect (e.g., BLUETOOTH), and the mobile device 110 in turn communicates over the wide-area network 120 using a cellular modem of the mobile device 110.

The navigation application 122 may be one application included on the storage 108 of the VCS 104. The navigation application 122 may include instructions that, when executed by the processor of the VCS 104, cause the VCS 104 to display a map depicting the vehicle in the context of the surrounding roads.

The map may be based off map data 124 maintained to the storage 108 of the VCS 104. The map data 124 may include information that may be queried to provide map information to a viewer of the display 114. As one example, the VCS 104 may load the map data 124, as needed, off a digital versatile disk (DVD). As another example, the VCS 104 may maintain the map data 124 on flash or HDD storage. The map data 124 may include, for example, information regarding roads that may be traversed by the vehicle 102 (e.g., location, name, endpoints, speed limit, traffic, etc.), as well as geographic features of the area surrounding the roadway (e.g., water, parks, desert, mountains, building outlines, etc.).

The navigation application 122 may further include instructions to cause the VCS 104 to utilize the map data 124 to identify routes for the vehicle 102. As an example, the navigation application 122 may be configured to identify a path along the road segments of the map data 124 from a current vehicle 102 location (or user-specified start location) to a location the driver wishes to reach. The navigation application 122 may be further configured to display the route in the HMI of the vehicle 102, such as by way of a highlighted path overlaid on the displayed map data 124, and/or as a listing of one or more driving instructions that, when followed, take the vehicle 102 the intended destination or waypoint POI. The navigation application 122 may further include instructions to provide an on-street parking feature depicting on-street parking availability for the road segments of the next intersection that the vehicle will reach.

The parking data server 126 may be configured to maintain parking data 130 regarding the current state of available parking. The current spot availability information may be determined from data sources such as networked parking meters, data feeds from parking garages, or from third-party services that provide parking information, such as SiriusXM, Park Whiz, Parkopedia, and/or IRNEX/ParkMe, as some examples. The parking data 130 may indicate the number, geographic locations, and/or availability of street parking. The parking data 130 may also include pricing information, hours of operation, street address, garage name and phone number or other additional details regarding the parking spots.

The parking data server 126 may be configured to receive parking queries 128 for parking data 130, and may provide the parking data 130 responsive to the parking queries 128. In an example, a VCS 104 of a vehicle 102 may query the parking data server 126 to retrieve parking data 130 within a region in which the vehicle 102 is currently located. In some examples, the parking data server 126 may further provide the ability for the VCS 104 to provide payment for a parking spot to confirm that the vehicle 102 has a location to park.

Figure 2:
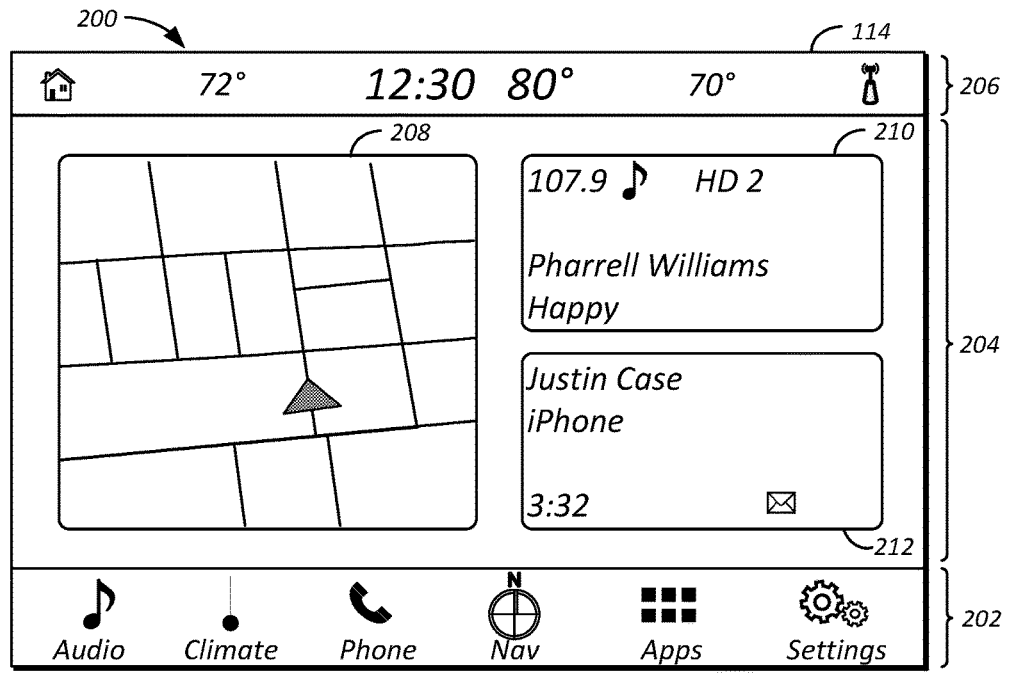
FIG. 2 illustrates an example of the vehicle computing system (VCS) displaying a main user interface of the VCS.

FIG. 2 illustrates an example of the VCS 104 displaying a main user interface 200 of the VCS 104. In an example, the user interface 200 may be displayed on a head unit or other display 114 of the vehicle 102.

As shown, the user interface 200 includes a category listing 202 of one or more screens of content to be displayed in the main screen area 204 of the head unit display 114. As some examples, the category listing 202 may include an audio screen from which configuration of vehicle 102 audio settings may be performed, a climate control screen from which vehicle 102 climate control settings may be configured, a phone screen from which calling services may be utilized, a navigation screen from which maps and routing may be performed, an applications screen from which installed applications may be invoked, and a settings screen from which backlighting or other general settings of the head unit display 114 may be accessed. The user interface 200 may also include a general information area 206 from which time, current temperature, and other information may remain visible to the user, regardless of the specific screen or application that is active in the main screen area 204.

The main screen area 204 may show summary content from multiple of the categories of content. In an example, the main screen area 204 may display a map summary 208 indicating a reduced version of the navigational map displayed when the navigation screen is selected. As some other examples, the main screen area 206 may display an audio summary 210 indicating a reduced version of the content displayed when the audio settings are selected, and a phone summary 212 indicating a reduced version of the content displayed when the phone settings are selected.

Figure 3:
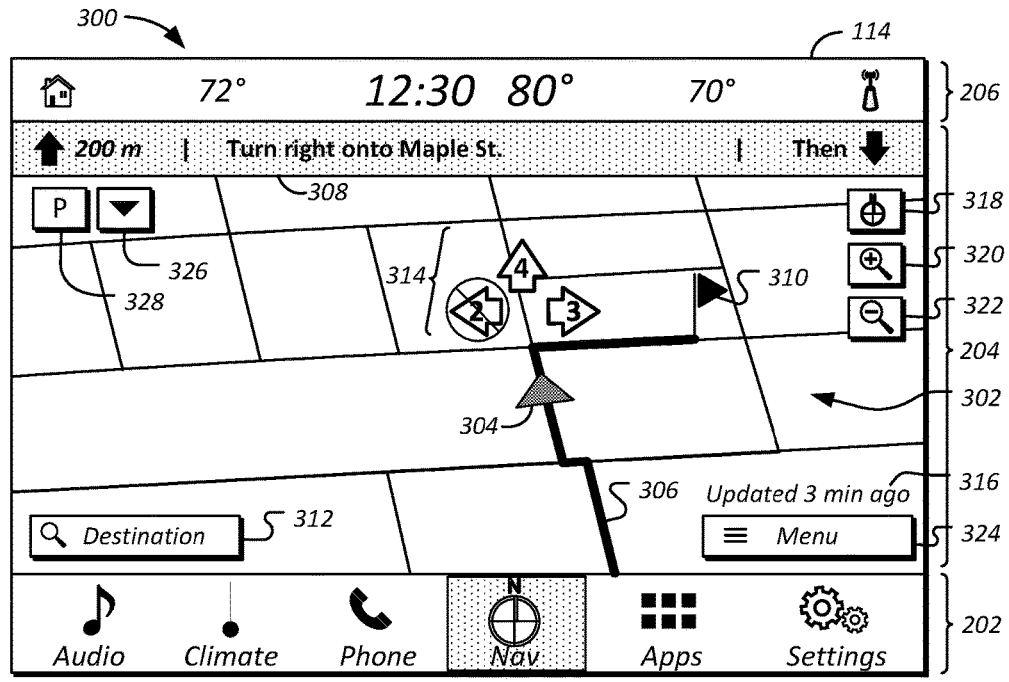
FIG. 3 illustrates an example of the VCS displaying a navigation user interface of the VCS including a route and the on-street parking feature.

FIG. 3 illustrates an example of the VCS 104 displaying a navigation user interface 300 of the VCS 104 including a route 306 and the on-street parking feature 314. The navigation user interface 300 may be displayed, in an example, by the navigation application 122 to a head unit display 114 responsive to user selection of the navigation screen from the category listing 202.

As shown, the user interface 300 includes a map 302. The map 302 may be displayed to the display screen 114 by the navigation application 122 using the map data 124. A current location of the vehicle 102 may be overlaid on the map 302 as vehicle indication 304. If the vehicle 102 is traversing a route 306, the route 306 may also be overlaid on the map 302 as shown. The user interface 300 may also include a routing information control 308 that specifies the next one or more driving instructions that, when followed, take the vehicle 102 a destination location 310 (which may also be overlaid on the map 302). The user interface 300 may also include a destination selection control 312, that, when selected by the user, allows the user to provide a new destination location for routing of the vehicle 102. If the vehicle is not traversing a route 306, however, then no route 306 will be displayed.

The on-street parking feature 314 includes information depicting the parking availability for the vehicle 102 based on the next intersection that the vehicle 102 will reach. Thus, the on-street parking feature 314 provides an overlay on the map 302 of how many parking spaces are available in each possible direction. In the illustrated example, the on-street parking feature 314 overlays an intersection view as the driver approaches the next intersection with arrows directed or pointing down each road segment of the intersection that the vehicle 102 may traverse (e.g., excluding road segments that are one way the wrong way). Each arrow may accordingly indicate how many parking spots are available in the next block if the driver turns the respective direction indicated by the arrow.

In the illustrated example, if the driver turns right at the next intersection three spots are indicated as being available, if the driver turns left at the next intersection two spots are indicated as being available, and if the driver goes straight at the next intersection four spots are indicated as being available.

In some examples, the on-street parking feature 314 depiction of the parking availability indicates a no symbol overlaid on the number of parking spots available down the respective leg. This may be done when that particular direction of travel is one way the wrong way and the vehicle 102 cannot turn down that path. However, the number of spots available may still be indicated, to provide the driver with context should the driver choose to go around the block to reach the indicated available parking.

The user interface 300 may also include a data age indication 316 specifying how recent the parking data 130 being displayed is. In an example, the data age indication 316 may indicate how recently the parking data 130 has been received from the parking data server 126. In other examples, if the parking data 130 indicates the age of the data, the data age indication 316 may indicate how old the data is, as opposed to how recently the data was received from the parking data server 126. In one example, the data age indication 316 may indicate that the parking data 130 was updated a certain number of minutes ago (e.g., 3 minutes ago in the illustrated example).

The user interface 300 may further include additional controls to allow the user to configure the navigation display. A navigation options control 318 may, when selected, may provide options to allow the user to configure the map 302 view display. A zoom-in control 320, when selected, may allow the user to increase the magnification level of the map 302, while a zoom-out control 322, when selected, may allow the user to decrease the magnification level of the map 302. A menu control 324, when selected, may allow the user to configure other aspects of the navigation application 122, such as the routing information control 308, audible prompts of the route information, etc.

The user interface 300 may also include a parking feature configuration control 326. Operation of the parking feature configuration control 326 is discussed in further detail with respect to FIG. 5. The user interface 300 may also include a parking reservation control 328. Operation of the parking reservation control 328 is discussed in further detail with respect to FIG. 6.

Figure 4:
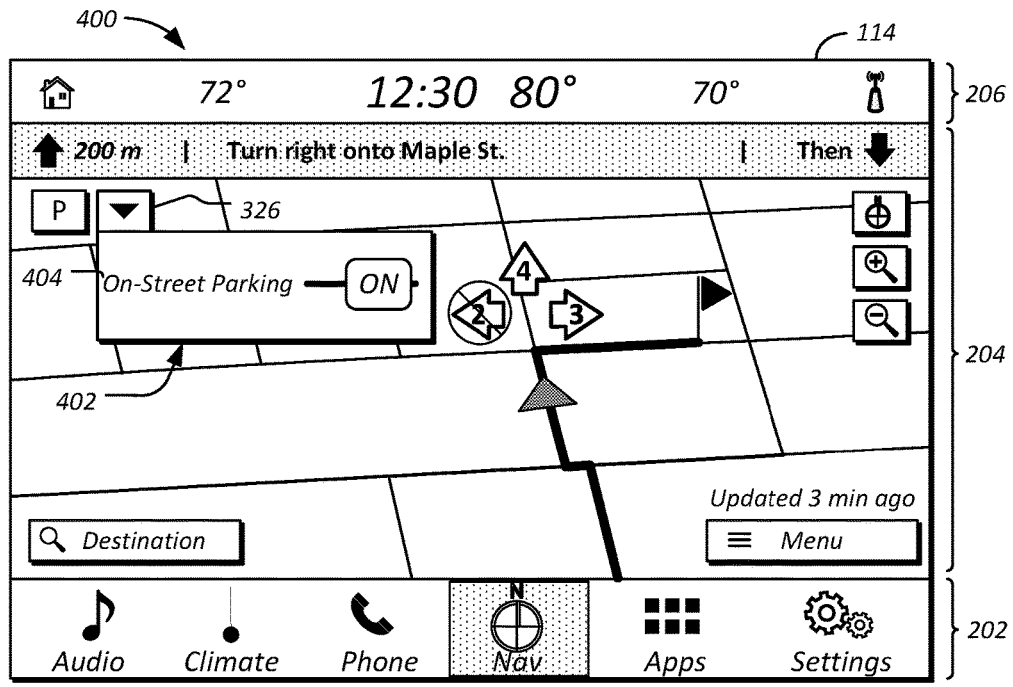
FIG. 4 illustrates an example of the VCS displaying a navigation user interface of the VCS including options for the display of the on-street parking feature.

FIG. 4 illustrates an example of the VCS 104 displaying a navigation user interface 400 of the VCS 104 including an options menu 402 for configuring display of the on-street parking feature 314. The options menu 402 may be displayed, for example, responsive to user selection of the parking feature configuration control 326.

As shown, the options menu 402 include an on-street parking feature enable option 404 allowing the user to select whether to enable or disable on-street parking features 314. The option may further display the current state of the option. For instance, as shown, on-street parking features 314 is enabled. The setting that is specified using the options menu 402 may be saved to the storage 108 of the VCS 104.

Additional options may be displayed in the options menu 402 in other examples. For instance, the options menu 402 may include a control through which the user may specify the whether to display the number of available spots or a symbol indicating available parking regardless of number of spots. As another example, the options menu 402 may include other settings related to the operation of the parking features. These may include a configurable predefined distance to a navigation destination of a route that the vehicle 102 should be within before displaying the parking features, and/or a configurable predefined number of intersections to a navigation destination that the vehicle 102 should be within before displaying the parking features.

As yet a further example, the additional options may include settings relating to the querying of the parking data server 126 by the navigation application 122. For instance, the navigation application 122 may query the parking data server 126 for parking data 130 periodically, and the options may include a setting configured to specify the period of the querying of the parking data server 126 (e.g., every five minutes, every thirty minutes, every hour, etc.).

Figure 5:
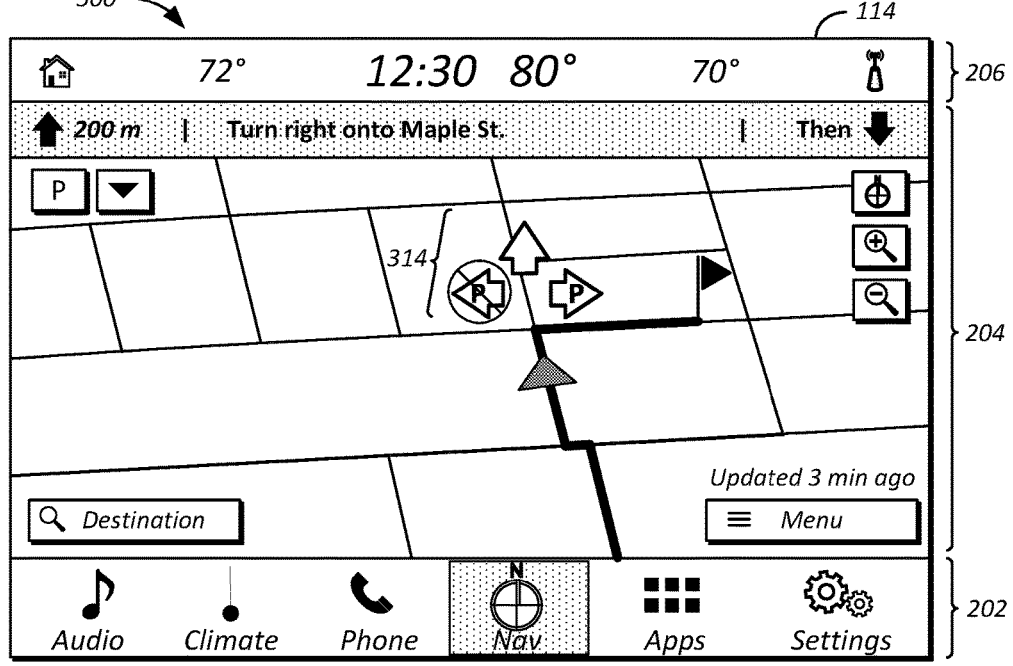
FIG. 5 illustrates an alternate example of the VCS displaying a navigation user interface of the VCS including a route and the on-street parking feature.

FIG. 5 illustrates an alternate example of the VCS 104 displaying a navigation user interface 500 of the VCS 104 including a route 306 and the on-street parking feature 314. As compared to the on-street parking feature 314 of the user interface 300, the arrows in the on-street parking feature 314 shown in user interface 500 indicate whether or not parking spots are available in the next block if the driver turns the respective direction indicated by the arrow, not whether a specific quantity of parking spots exists. In the illustrated example, the inclusion of the letter "P" within an arrow indicates that parking is available (e.g., one or more spots are available, at least a predefined minimum threshold number of spots are available, etc.), while the absence of the letter "P" within an arrow indicates that no parking is available (e.g., no spots are available, fewer than the predefined minimum threshold number of spots are available, etc.). The predefined minimum threshold number may also be configurable in the parking options.

Figure 6:
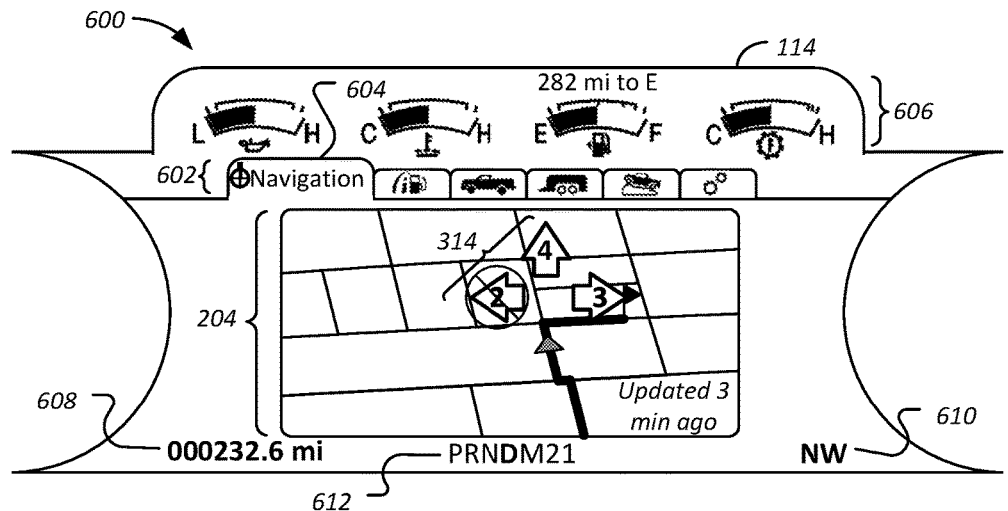
FIG. 6 illustrates an example of the VCS displaying a navigation user interface of the VCS to a gauge cluster display of the vehicle.

FIG. 6 illustrates an alternate example of the VCS 104 displaying a navigation user interface 600 of the VCS 104 to a gauge cluster display 114 of the vehicle 102. Accordingly, display of on-street parking features 314 indications may be done in the gauge cluster display 114 to provide the parking information at a location along with the other gauges or controls of the vehicle 102.

Among other elements, the user interface 600 may include a tab control 602 configured to indicate a various available categories of information. The tab control 602 may operate as a menu, such that a user of the user interface 600 may be able to switch through the tabs of the tab control 602 (e.g., through selection of back and next buttons on the steering wheel or elsewhere). Moreover, the tab control 602 may further illustrate the currently-selected tab 604 to distinguish it from the other tabs. In the illustrated example, the currently-selected tab 604 may be illustrated as larger than the other tabs of the tab control 602 and with the textual name of the tab 604, while the other tabs may be illustrated as of a smaller size and with only an icon but no textual name. It should be noted that this is merely, one example, and other forms of tab control 602 and indicated selection of the currently-selected tab 604 may be utilized as well.

As shown the "Navigation" tab 604 is presently selected. Due to selection of "Navigation" the user interface 600 displays navigation information to the main screen area 204 of the user interface 600. Apart from location, the information displayed to the main screen area 204 in the user interface 600 is consistent to the information displayed in the head unit displays 114 in the user interfaces 300-500.

The user interface 600 may also include additional display elements that are independent of the section of a tab from the tab control 602. For instance, the user interface 600 may include a set of gauges 606 configured to display general information regarding the status of the vehicle 102. As shown, the gauges 606 include an oil temperature gauge, a coolant temperature gauge, a fuel gauge, and a transmission temperature gauge, but these are merely examples and fewer, different or additional gauges 606 may be displayed as well. As some other possibilities, the user interface 600 may illustrate an odometer 608 to indicate to the user the total miles traveled, a gear indication 612 indicating the currently selected gear, and a direction indication 610 indicating the direction in which the vehicle 102 is facing.

Figure 7:
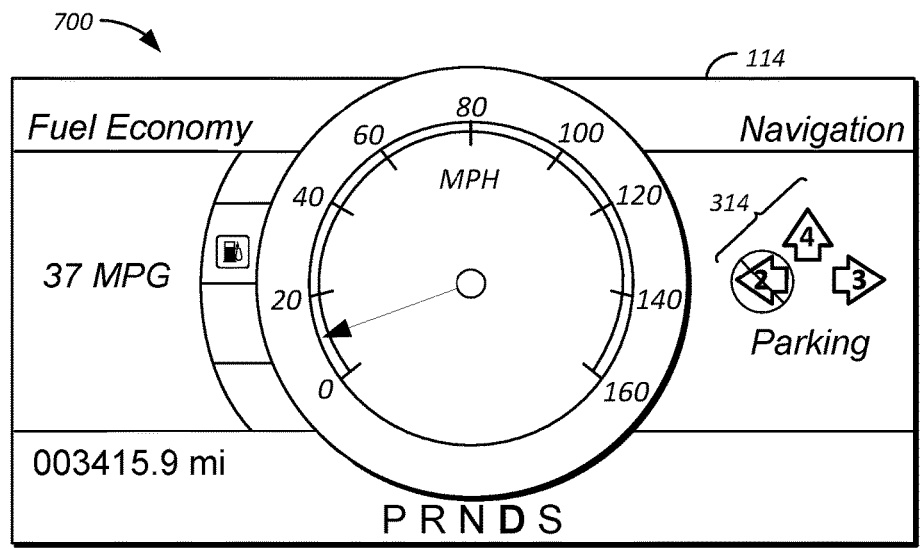
FIG. 7 illustrates an alternate example of the VCS displaying a navigation user interface of the VCS to a gauge cluster display of the vehicle.

FIG. 7 illustrates an alternate example of the VCS 104 displaying a navigation user interface 700 of the VCS 104 to a gauge cluster display 114 of the vehicle 102. As compared to the user interface 600, the gauge cluster user interface 700 does not include a navigational map 302. Instead, the user interface 700 provides parking features in a turn-by-turn directional style. For instance, as shown the on-street parking features 314 for the next upcoming intersection are provided in the display 114. In another examples, a textual representation of the on-street parking features 314 may be provided in place of the graphical on-street parking features 314, where the text indicates whether parking is available or hoe many parking spaces are available in each available direction. As one possibility consistent with the on-street parking features 314, text such as "4 parking spots ahead, 3 parking spots to the right" could be displayed.

Figure 8:
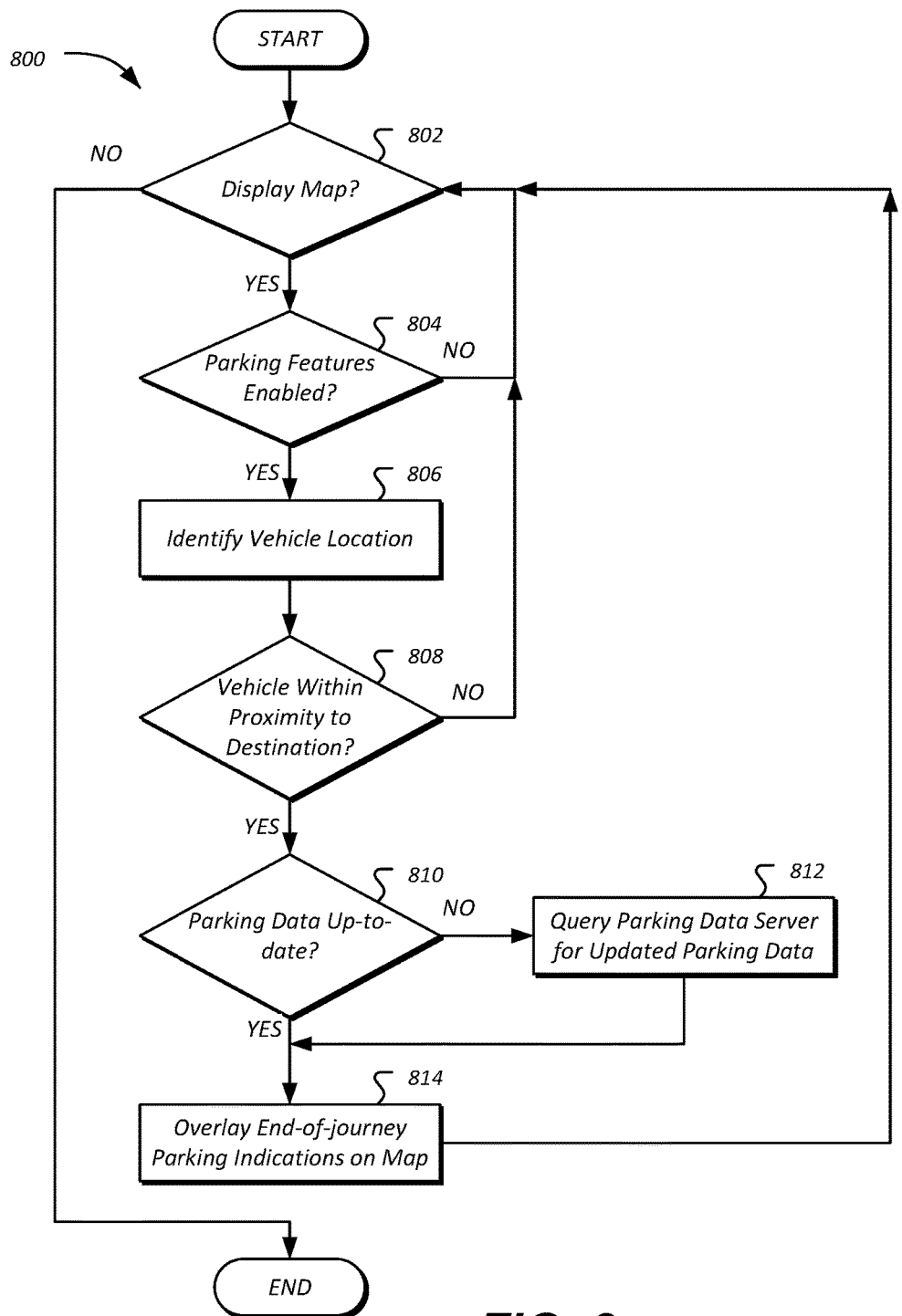
FIG. 8 illustrates an example process for implementing on-street parking features.

FIG. 8 illustrates an example process 800 for implementing on-street parking features 314. In an example, the process 800 may be performed by the VCS 104 executing the navigation application 122.

At operation 802, the VCS 104 determines whether to display a map 302. In an example, the VCS 104 executes the navigation application 122 to provide the map 302 to the display screen 114 using the map data 124 stored to the storage 108 of the VCS 104. The map 302 may be displayed responsive to selection of the navigation screen from the category listing 202 of the user interface 200. Or, the map 302 may be displayed in the main user interface 200 as a map summary 208 indicating a reduced version of the navigational map as compared to the map 302 displayed when the navigation screen is selected. If a map 302 is to be displayed, control passes to operation 804. If not, the process 800 ends.

At 804, the VCS 104 determines whether parking features are enabled. In an example, the VCS 104 accesses the storage 108 of the VCS 104 to identify whether one on-street parking feature 314 is enabled. If so, control passes to operation 806. Otherwise, control return to operation 802.

At operation 806, the VCS 104 identifies a location of the vehicle 102. In an example, the VCS 104 may access the global positioning system (GPS) module 118-B over the vehicle bus 116 to receive current vehicle 102 location and heading information.

The VCS 104 determines whether the vehicle 102 is within proximity to a destination of the vehicle 102 at 808. In an example, the VCS 104 may initiate display of the depiction of parking availability responsive to determining that the vehicle 102 is within a predefined distance to a navigation destination of a route displayed to the map 302. In another example, the VCS 104 may initiate display of the depiction of parking availability responsive to determining that the vehicle 102 is within a predefined number of intersections to a navigation destination of a route displayed to the map 302. The VCS 104 may determine the predefined distance and predefined number of intersections from settings stored to the storage 108 of the VCS 104. In other examples, the VCS 104 may initiate display of the depiction of parking availability responsive to the vehicle 102 driving into a dense city environment, or responsive to the vehicle 102 driving towards a home or favorite location. If the vehicle 102 is within proximity to a destination, control passes to operation 810. Otherwise, control returns to operation 802.

At 810, the VCS 104 determines whether parking data 130 available to the VCS 104 is up-to-date. In an example, the VCS 104 accesses parking data 130 stored to the storage 108 to determine an age indicated by the parking data 130. In another example, the VCS 104 determines the age of the parking data 130 according to the download data of the parking data 130. If the parking data 130 is older than a predefined amount of time (e.g., five minutes, thirty minutes, etc.), control passes to operation 812. Otherwise, control passes to operation 814. In other examples, the VCS 104 may periodically determine to refresh the parking data 130, without regard to the age of currently stored parking data 130.

At operation 812, the VCS 104 queries the parking data server 126 for up-to-date parking data 130. In an example, the VCS 104 sends a parking query 128 to the parking data server 126 for parking data 130 within the region in which the vehicle 102 is currently located. The VCS 104 may receive updated parking data 130 from the parking data server 126 responsive to the parking query 128.

At 814, the VCS 104 overlays the map 302 with end-of-journey parking indications. In an example, the VCS 104 may overlay the map 302 with on-street parking features 314 as discussed in detail above. After operation 814, the process 800 returns to operation 802.

Computing devices described herein, such as the VCS 104, mobile device 110, ECUs 118, and parking data server 126, generally include computer-executable instructions where the instructions may be executable by one or more computing devices such as those listed above. Computer-executable instructions, such as those of the navigation application 122, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a memory storing parking data; and
a processor of a vehicle programmed to
    display, to a screen, a map including a current location of the vehicle and an upcoming intersection to be traversed by the vehicle, and
    responsive to the vehicle being within a predefined number of intersections to a navigation destination of a route displayed to the map, initiate overlay, on the map, of a depiction of parking availability indicating, for each leg of the intersection, a number of on-street parking spots available down the respective leg according to the parking data.

2. The system of claim 1, wherein the depiction of the parking availability includes a first arrow pointing down a first leg of the intersection including a numeral specifying a number of on-street parking spots available down the first leg, and a second arrow pointing down a second leg of the intersection including a numeral specifying a number of on-street parking spots available down the second leg.

3. The system of claim 2, wherein the depiction of the parking availability includes a third arrow pointing down a third leg of the intersection including a numeral specifying a number of on-street parking spots available down the third leg.

4. The system of claim 1, wherein the depiction of the parking availability indicates a no symbol overlaid on the number of parking spots available down the respective leg when the leg is a wrong way direction for the vehicle.

5. The system of claim 1, wherein the number of on-street parking spots indicates a number of spots available down the respective leg until a next intersection.

6. The system of claim 1, wherein the number of on-street parking spots indicates a number of spots available down the respective leg within a predefined maximum distance threshold.

7. The system of claim 1, wherein the processor is further programmed to:
    query a parking server for updated parking data; and
    overlay, on the map, an indication of when the updated parking data was received from the parking server.

8. The system of claim 1, wherein the processor is further programmed to initiate display of the depiction of parking availability responsive to determining that the vehicle is within a predefined distance to a navigation destination of a route displayed to the map.

9. A method comprising:
    overlaying, responsive to a vehicle being within a predefined number of intersections to a route destination, on a map indicating a current location of the vehicle and an upcoming intersection to be traversed by the vehicle, a depiction of parking availability indicating, for each leg of the intersection, a number of on-street parking spots available down the respective leg according to server-queried parking data descriptive of locations of available on-street parking.

10. The method of claim 9, wherein the number of on-street parking spots indicates a number of spots available down the respective leg until a next intersection.

11. The method of claim 9, wherein the number of on-street parking spots indicates a number of spots available down the respective leg within a predefined maximum distance threshold.

12. The method of claim 9, further comprising:
    querying a parking server for updated parking data; and
    overlaying, on the map, an indication of when the updated parking data was received from the parking server.

13. The method of claim 9, further comprising initiating display of the depiction of parking availability responsive to determining that the vehicle is within a predefined distance to a navigation destination of a route displayed to the map.

14. A non-transitory computer-readable medium comprising instructions of a navigation application that, when executed by a processor of a vehicle computing system, cause the processor to responsive to a vehicle being within a predefined number of intersections to a route destination, overlay, on a map indicating a current location of a vehicle and an upcoming intersection to be traversed by the vehicle, a depiction of parking availability indicating, for each leg of the intersection, an availability on-street parking spots available down the respective leg according to the parking data.

15. The medium of claim 14, wherein the availability indicates a number of on-street parking spots available down the respective leg according to the parking data.

16. The medium of claim 14, wherein the availability indicates a first representation when at least a predefined number of parking spots are available down the respective leg according to the parking data, and a second representation otherwise.

* * * * *